Patented Feb. 23, 1932

1,846,151

UNITED STATES PATENT OFFICE

KARL SCHNITZSPAHN, OF OFFENBACH-ON-THE-MAIN, GERMANY, ASSIGNOR TO GENERAL ANILINE WORKS, INC., OF NEW YORK, N. Y., A CORPORATION OF DELAWARE

NEW SOLID DIAZOAZOSALTS

No Drawing. Application filed September 29, 1927, Serial No. 222,944, and in Germany October 5, 1926.

My invention relates to new solid diazonium arylsulfonates corresponding probably to the general formula:

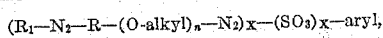
$(R_1-N_2-R-(O\text{-alkyl})_n-N_2)_x-(SO_3)_x-\text{aryl}$, wherein R and $R_1$ each stand for an arylresidue, not containing a sulfonic or carboxylic group and $n$ and X stand for the numbers 1 or 2. The diazosalts may be obtained by diazotizing in the usual manner aminoazobodies, derived from diazocompounds not containing a sulfonic or carboxylic group and aminoderivatives of mono- or polyvalent aryloxalkylethers, such as ortho-aminophenolether, aminocresolether, aminohydroquinoneethers, 1.2-aminonapholethers and derivatives capable of forming para-aminoazobodies, and separating from the diazosolutions thus obtained aryl sulfonic diazosalts by double decomposition with arylsulfonic or polysulfonic metal salts. As such salts may be named for instance the salts of benzene-sulfonic, para-chlorobenzene-sulfonic acid, napthalene-di- and polysulfonic acids, such as napthalene-2.7- and 1.5-disulfonic acid. Instead of polysulfonic metal salts also the free acids may be used for separating acid arylpolysulfonic diazoazosalts. In this case the arylresidue, attached to the $SO_3$-group in the aforesaid formula, contains at least one further $SO_3H$ group.

It was hitherto unknown that the monodiazoazocompounds of the aforesaid chemical constitution can be isolated in a solid form and that the stability of the solid products is sufficient for the use for dyeing and printing purposes, and only the corresponding diazosolutions newly made from the bases were used hitherto for instance for the process of U. S. A. Patent No. 1,498,417. Therefore the present solid diazonium arylsulfonates are new products. They are orange to reddish brown colored powders, soluble in water with a yellowish to reddish brown color.

The stability and the commercial value of the new solid diazonium arylsulfonates is apparently a consequence of the chemical constitution of the aforesaid aminoazocompounds which are characterized by an alkoxygroup, standing in ortho-position to the aminogroup to be diazotized.

The new solid diazonium arylsulfonates may be mixed with partly or totally dehydrated salts and other suitable diluents. They represent most concentrated diazo preparations which are ready for immediate use and yield partciularly valuable disazo dyestuffs on the fibers.

In order to further illustrate my invention the following examples are given, the parts being by weight and all temperatures in Centigrade degrees, but it is to be understood, that my invention is not limited to the particular products or reacting conditions mentioned therein.

*Example 1.*—A diazonium chloride solution obtained from 286 parts of the amino azo body, 4-nitrobenzene-azo-4'-amino-3'-methoxy-6'-methylbenzene is mixed with a warm concentrated solution of 572 parts of sodium benzenesulfonate. The diazonium arylsulfonate corresponding probably to the formula:

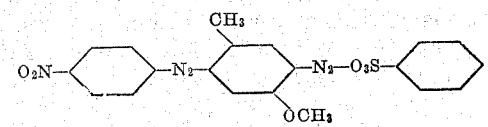

separates in the cold. It is filtered and dried at low temperatures. It forms an orange-brown powder, soluble in water with a brownish color.

*Example 2.*—A diazonium chloride solution obtained from 322 parts of the amino azo body, 2-methoxy-5-chlorobenzene-azo-4'-amino-3'.6'-dimethoxybenzene, is mixed with a warm concentrated solution of 250 parts of sodium para-chlorobenzenesulfonate. The diazonium phenylsulfonate corresponding probably to the formula:

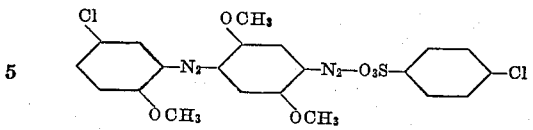

thus separates. It is filtered and dried. It represents a brownish powder.

*Example 3.*—A diazonium chloride solution prepared from 300 parts of the amino azo body, 2-nitrobenzene-azo-4'-amino-3'-ethoxy-6'-methylbenzene is mixed with a concentrated solution of 250 parts of sodium 2.7-naphthalene-disulfonate. The separating diazonium arylsulfonate corresponding probably to the formula:

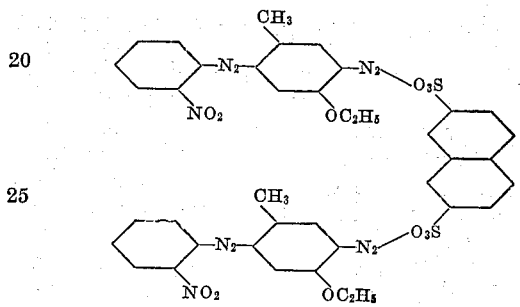

is filtered off, dried and mixed with usual diluents. It forms a brownish powder, soluble in water with a brownish color.

*Example 4.*—In a corresponding manner 262 parts of the amino azo body, 2-chlorobenzene-azo-4'-amino-3'-methoxybenzene, are diazotized and the diazo-solution is mixed with a solution of 250 parts of sodium 1.5-naphthalene-disulfonate. The diazonium arylsulfonate which separates corresponds probably to the formula:

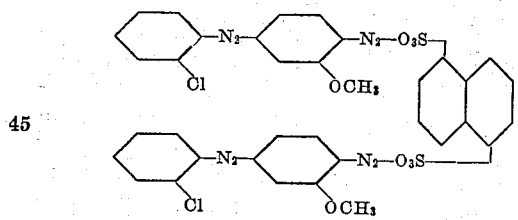

In the same manner other diazoazocompounds of the aforesaid chemical constitution, containing further substituents in different configurations in the nuclei signified in the general formula by R and $R_1$, may be separated as solid arylsulfonic salts.

I claim:

1. As new products solid diazonium-arylsulfonates corresponding to the general formula:

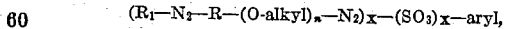

wherein R and $R_1$ each stand for an aryl-residue, not containing a sulfonic or carboxylic group, $n$ and $x$ stand for the numbers 1 or 2 which diazonium-arylsulfonates are orange to reddish brown powders, soluble in water with a yellowish to reddish brown color.

2. As new products solid diazonium-arylsulfonates corresponding to the general formula:

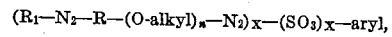

wherein R and $R_1$ each stand for an aryl residue, not containing a sulfonic or carboxylic group, $n$ and $x$ stand for the numbers 1 or 2, and wherein one alkoxy group stands in ortho-position to the diazonium aryl-sulfonate group, which diazoniumarylsulfonates are orange to reddish-brown powders, soluble in water with a yellowish to reddish-brown color.

3. As a new product the solid diazonium-phenylsulfonate corresponding probably to the formula

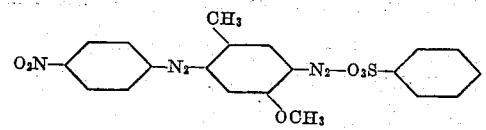

which diazonium-phenylsulfonate is an orange-brown powder, soluble in water with a brownish color.

4. As a new product, the solid diazonium phenylsulfonate corresponding probably to the formula:

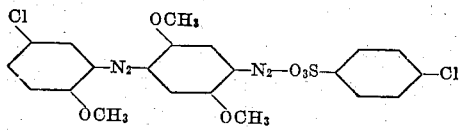

which diazonium phenylsulfonate is a brownish powder soluble in water.

5. As a new product, the solid diazonium aryl-sulfonate corresponding probably to the formula:

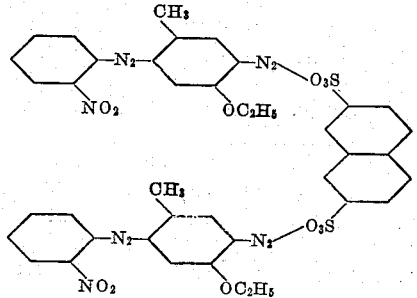

which diazonium arylsulfonate is a brownish powder soluble in water with a brownish color.

In testimony whereof, I affix my signature.

KARL SCHNITZSPAHN.